(12) United States Patent
Mukhopadhyay et al.

(10) Patent No.: US 9,456,257 B2
(45) Date of Patent: Sep. 27, 2016

(54) DEVICE FOR TRANSFERRING POWER FROM A FIRST CIRCUIT TO A SECOND CIRCUIT

(71) Applicant: Texas Instruments Incorporated, Dallas, TX (US)

(72) Inventors: Rajarshi Mukhopadhyay, Allen, TX (US); Mark W. Morgan, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 89 days.

(21) Appl. No.: 14/480,013

(22) Filed: Sep. 8, 2014

(65) Prior Publication Data

US 2015/0070949 A1   Mar. 12, 2015

Related U.S. Application Data

(60) Provisional application No. 61/876,975, filed on Sep. 12, 2013.

(51) Int. Cl.
| | | |
|---|---|---|
| *H02J 3/12* | (2006.01) | |
| *G05F 1/00* | (2006.01) | |
| *G05F 3/16* | (2006.01) | |
| *G05F 3/20* | (2006.01) | |
| *H02H 7/125* | (2006.01) | |
| *H02M 7/08* | (2006.01) | |

(Continued)

(52) U.S. Cl.
CPC ............... *H04Q 9/00* (2013.01); *H02M 7/219* (2013.01)

(58) Field of Classification Search
CPC .......... G05F 1/59; G05F 1/595; G05F 1/613; G05F 1/614; H02M 2001/0012; H02M 2001/0041; H02M 3/157; H02M 3/33515; H02M 3/33523; H02M 1/082; H02M 1/088; H02M 1/092; H02M 7/145; H02M 7/1557; H02M 7/17
USPC ............... 323/241, 283, 285, 286, 315, 317; 363/47, 48, 53, 54, 65, 67, 69, 70, 363/76–79, 81, 84–86, 88, 89, 125–128, 363/130
See application file for complete search history.

(56) References Cited

U.S. PATENT DOCUMENTS

| | | | | |
|---|---|---|---|---|
| 4,412,278 | A * | 10/1983 | Cambier | H02M 7/06 363/126 |
| 5,600,551 | A * | 2/1997 | Luscher, Jr. | H02M 3/073 307/110 |
| 2002/0196642 | A1* | 12/2002 | Goder | H02M 3/073 363/21.11 |

(Continued)

*Primary Examiner* — Adolf Berhane
*Assistant Examiner* — Gary Nash
(74) *Attorney, Agent, or Firm* — Michael A. Davis, Jr.; Frank D. Cimino (57) ABSTRACT

A power transfer system for transferring power from a first circuit to a second circuit by a differential signal generated in the first circuit includes a first isolation element for transmitting a first component of the differential signal between the first and second circuits. The system also includes a second isolation element for transmitting a second component of the differential signal between the first and second circuits. A digital rectifier is coupled to the first and second isolation elements for generating a rectified voltage in response to the first and second components of the differential signal. The system includes circuitry for monitoring the rectified voltage and generating a signal representative of the rectified voltage. The system also includes a controller for changing the rectified voltage in response to the signal representative of the rectified voltage.

20 Claims, 4 Drawing Sheets

(51) Int. Cl.
  H04Q 9/00 (2006.01)
  H02M 7/219 (2006.01)

(56) References Cited

U.S. PATENT DOCUMENTS

2005/0207182 A1* 9/2005 Wang .................. H02M 1/38
                                                          363/17
2005/0243496 A1* 11/2005 Harris .................... H04M 3/18
                                                          361/118
2008/0192509 A1* 8/2008 Dhuyvetter ....... H02M 3/33523
                                                          363/17
2009/0261790 A1* 10/2009 Arduini ............. H02M 3/33592
                                                          323/266
2013/0106485 A1* 5/2013 Mukho-
                                     padhyay ........ H03K 19/018507
                                                          327/333

* cited by examiner

DEVICE FOR TRANSFERRING POWER FROM A FIRST CIRCUIT TO A SECOND CIRCUIT

CROSS-REFERENCE TO RELATED APPLICATION

This application claims priority to U.S. Provisional Patent Application Ser. No. 61/876,975, filed Sep. 12, 2013, entitled ISOLATED CAPACITIVE POWER SENSOR, naming Rajarshi Mukhopadhyay, et al. as inventors, which is hereby fully incorporated herein by reference for all purposes.

BACKGROUND

Some processing circuits use data from sensors to measure parameters, such as temperature. These processing circuits typically operate at low voltages, such as 3.3 volts or 5.0 volts, but some of the sensors can operate at much higher voltages. Also, some circuits that drive the sensors and/or process data therefrom can operate at the higher voltages.

Some of those systems are subject to common mode transient immunity (CMTI) problems. More specifically, some high voltage transients on one circuit may cause data errors between the high voltage circuits and the low voltage circuits. For example, a high voltage transient on a ground plane may cause a logic high data signal to become a logic low data signal or vice versa. Electrical isolation barriers can be used between the high voltage circuits and the low voltage circuits to increase the CMTI. However, those barriers do not always prevent the CMTI issues.

SUMMARY

A power transfer system for transferring power from a first circuit to a second circuit by a differential signal generated in the first circuit includes a first isolation element for transmitting a first component of the differential signal between the first and second circuits. The system includes a second isolation element for transmitting a second component of the differential signal between the first and second circuits. The second component is a complement of the first component. A digital rectifier is coupled to the first and second isolation elements for generating a rectified voltage in response to the first and second components of the differential signal. The system includes circuitry for monitoring the rectified voltage and generating a signal representative of the rectified voltage. The system also includes a controller for changing the rectified voltage in response to the signal representative of the rectified voltage.

DETAILED DESCRIPTION

Figure 1:
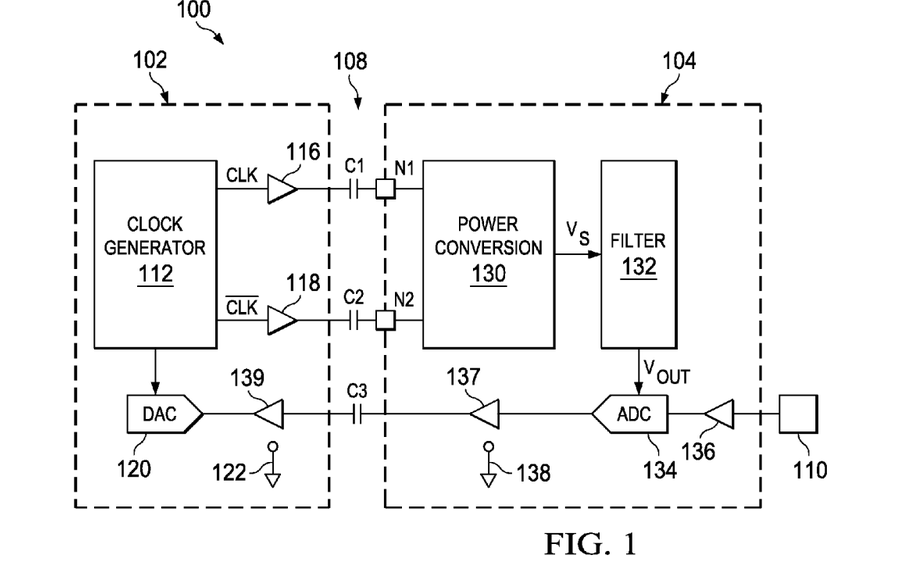
FIG. 1 is a block diagram of an example power transfer system for transferring power between a low voltage portion of the system and a high voltage portion of the system.

FIG. 1 is a block diagram of an example power transfer system 100 for transferring power between a first circuit 102 and a second circuit 104. In this example, the first circuit 102 operates as a low side, and the second circuit 104 operates as a high side. Accordingly, the first circuit 102 operates at relatively low voltages (such as 3.3 or 5.0 volts in some embodiments), and the second circuit 104 operates at voltages higher than such voltages of the first circuit 102. For example, in some embodiments, the second circuit 104 operates at voltages that are approximately 1 kV, or that are 1 kV higher than the voltages on the first circuit 102. In some examples, a ground reference of the second circuit 104 is at a much higher potential than a ground reference of the first circuit 102. Isolation elements 108 electrically separate or isolate the first circuit 102 from the second circuit 104. In the example of FIG. 1, the isolation elements 108 include capacitors C1, C2 and C3.

As shown in FIG. 1, the system 100 includes circuitry to operate a sensor 110 and to analyze data generated by the sensor 110. In the example of FIG. 1, the sensor 110 generates analog signals or voltages indicative of the parameter being sensed or measured. The sensor 110 operates at high voltage, which in the embodiments described herein, is high enough to possibly damage electronic components located in the first circuit 102. In order to prevent damage, the sensor 110 is electrically isolated from the first circuit 102.

Figure 2:
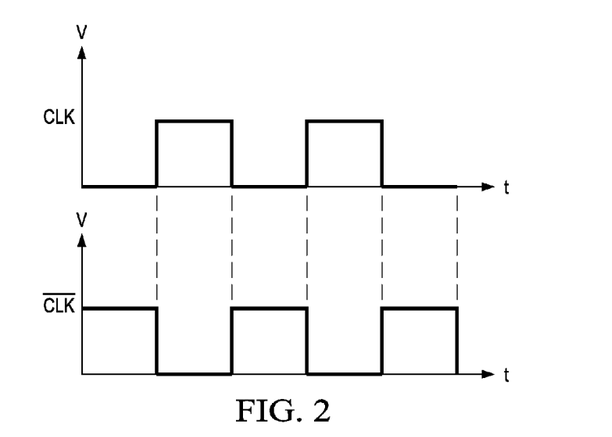
FIG. 2 is an example timing diagram of clock signals CLK and $\overline{CLK}$ generated by the clock generator of FIG. 1.

FIG. 2 is an example timing diagram of clock signals CLK and $\overline{CLK}$ generated by a clock generator 112. As shown in FIG. 2, the clock signal CLK is a complement (e.g., opposite) of the clock signal $\overline{CLK}$. In ideal conditions, the edges of the clock signals CLK and $\overline{CLK}$ are vertical, indicating that they rise and fall in zero time. Also, one clock signal rises at the same time that the other clock signal falls and vice versa. The CLK and the $\overline{CLK}$ signals are example components of a differential signal. The clock signals CLK and $\overline{CLK}$ are output to (and received by) drivers 116 and 118, which increase the power of the clock signals CLK and $\overline{CLK}$ for transmission through the isolation elements 108 and to the second circuit 104. In some embodiments, the drivers 116 and 118 are incorporated into the clock generator 112 and are not discrete components as shown in FIG. 1. In other embodiments, the clock signals CLK and $\overline{CLK}$ are not amplified by drivers. The first circuit 102 further includes a digital to analog converter (DAC) 120, whose timing is controlled by signals that are generated by the clock generator 112.

The devices in the first circuit 102 operate on voltages referenced to a first ground 122. As an example, the clock signals CLK and $\overline{CLK}$ are referenced to the first ground 122, and many of the components (such as the clock generator 112 and the DAC 120) are coupled (e.g., connected) to the first ground 122. In some embodiments, the first ground 122 is representative of a ground plane proximate many of the devices on the first circuit 102. The system 100 transfers energy from the first circuit 102 to the second circuit 104 through the clock signals CLK and $\overline{CLK}$, even if the system 100 is subjected to a transient, such as transients occurring on the first ground 122.

In the example of FIG. 1, the clock signals CLK and $\overline{CLK}$ are relatively low voltage signals (such as 3.3 or 5.0 volts in some embodiments) as referenced to the first ground 122.

The clock signals CLK and $\overline{\text{CLK}}$ supply power to devices on the second circuit 104, which benefits from the isolation elements 108 between the first circuit 102 and the second circuit 104. In the example of FIG. 1, the isolation elements 108 are capacitors C1 and C2. The capacitors C1 and C2 pass AC signals, so the clock signals CLK and $\overline{\text{CLK}}$ pass through the isolation elements 108. Accordingly, in this example, the isolation elements 108 operate as barriers to prevent DC voltages on the second circuit 104 from interfering with devices operating on the first circuit 102 and vice versa.

The clock signals CLK and $\overline{\text{CLK}}$ are output to (and received by) a power conversion device 130, which converts the clock signals CLK and $\overline{\text{CLK}}$ to power for operating devices on the second circuit 104. For example, the power conversion device 130 converts the AC clock signals CLK and $\overline{\text{CLK}}$ into DC operating voltages for the devices in the second circuit 104. In the example of FIG. 1, the devices in the second circuit 104 include a filter 132 and an analog to digital converter (ADC) 134. In some embodiments, devices (not shown) in the second circuit 104 convert the clock signals CLK and $\overline{\text{CLK}}$ into signals that are suitable for the ADC 134 operations. The devices and signals in the second circuit 104 operate in reference to a second ground 138, which is electrically isolated or separate from the first ground 122 in the first circuit 102.

As described above, the system 100 is coupled to the sensor 110, which is electrically isolated from the first circuit 102. The sensor 110 measures a parameter, such as temperature, and outputs an analog signal representative of the measured parameter. The ADC 134 receives the analog signal generated by the sensor 110 and converts the analog signal to a digital signal. The ADC 134 outputs the digital signal, which is transmitted to the DAC 120 on the first circuit 102. In the example of FIG. 1, the digital signal is passed through the capacitor C3 of the isolation elements 108, because the DAC 120 is part of the first circuit 102, and the ADC 134 is part of the second circuit 104. Other embodiments include different isolation devices. The analog signal generated by the DAC 120 is processed according to specifications of the system 100 implementation.

The power conversion device 130 converts the clock signals CLK and $\overline{\text{CLK}}$ into voltages that drive devices on the second circuit 104, while substantially preserving common-mode transient immunity (CMTI) between the first circuit 102 and the second circuit 104. The CMTI is a measure of rate and magnitude that the transient can achieve before causing data errors on the second circuit 104. In an example of testing the CMTI, a high voltage/high speed transient is introduced on the ground of one of the circuits, and errors are detected in data transfer between the two circuits. In some examples, the clock signals CLK and $\overline{\text{CLK}}$ are fixed at specific logic levels, and a high voltage transient (such as one rising at a rate of 50 kV/µs) is induced on the first ground 122. CMTI issues arise when the transient causes those logic levels to change.

Figure 3:
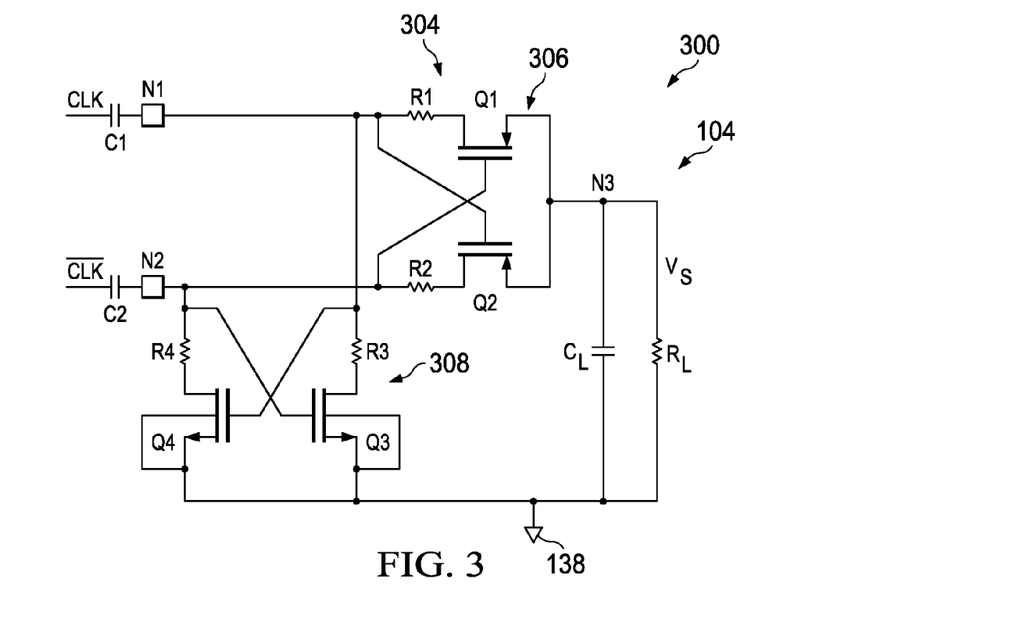
FIG. 3 is a schematic diagram of example circuitry of the power conversion device of FIG. 1.

FIG. 3 is a schematic diagram of example circuitry 300 of the power conversion device 130 of FIG. 1. The schematic diagram of the power conversion device 130 of FIG. 3 shows the portion of the power conversion device 130 that generates a supply voltage $V_S$ from the clock signals CLK and $\overline{\text{CLK}}$. Other embodiments of the power conversion device 130 are described below.

The clock signals CLK and $\overline{\text{CLK}}$ are output to (and received by) the second circuit 104 at nodes N1 and N2, respectively, which are coupled to the isolation elements 108. The nodes N1 and N2 are coupled to a digital rectifier 304, which converts the clock signals CLK and $\overline{\text{CLK}}$ to the voltage $V_S$. The digital rectifier 304 has a first circuit 306 that converts the CLK signals to a DC voltage and a second circuit 308 that converts the $\overline{\text{CLK}}$ signals to a DC voltage. The first circuit 306 has a resistor R1 that is coupled to the drain of a field effect transistor (FET) Q1. The FETs in the digital rectifier 304 perform switching operations. Other embodiments include other types of electronic switches, such as bipolar junction transistors. A second resistor R2 is coupled to the drain of a FET Q2. The resistors R1 and R2 are coupled to the nodes and N2, respectively. The gate of the FET Q1 is coupled to the $\overline{\text{CLK}}$ signal, and the gate of the FET Q2 is coupled to the CLK signal.

The resistors R1 and R2 shield the input capacitors C1 and C2 from the device capacitances, such as the capacitances in the FETs Q1 and Q2, which reduces the charge sharing loss, and boosts the power transfer efficiency. If the values of the resistors R1 and R2 are too large, they reduce the output voltage $V_S$ because of the voltage drop across the resistors R1 and R2. If the values of the resistors R1 and R2 are too small, they do not shield the capacitors C1 and C2 from device capacitances effectively. In some embodiments, the values of the resistors R1 and R2 are equal to four times the input voltage divided by the maximum input current. In other embodiments, the resistors R1 and R2 are replaced by other types of resistive elements.

The second circuit 308 is similar to the first circuit 306. The second circuit 308 has a resistor R3 coupled to the drain of a FET Q3. The source of the FET Q3 is coupled to the second ground 138. A resistor R4 is coupled to the drain of a FET Q4. The source of the FET Q4 is also connected to the second ground 138. The resistor R3 is coupled to the node N1, and the resistor R4 is coupled to the node N2. The resistors R3 and R4 serve the same purposes as the resistors R1 and R2 as described above.

The first circuit 306 and the second circuit 308 operate to convert the differential clock signals of FIG. 2 to a DC voltage or a rectified voltage. Together, the first and second circuits 306 and 308 generate and control an output voltage $V_S$ at node N3, which is coupled to the sources of the FETs Q1 and Q2. The voltage $V_S$ at the node N3 relative to the second ground 138 remains positive, irrespective of the differential clock signals on the nodes N1 and N2. In some embodiments, the node N3 is coupled to a capacitor $C_L$ and a resistance $R_L$, which is characteristic of the load resistance coupled to the node N3. In some embodiments, the node N3 is also coupled to a voltage regulator (not shown in FIG. 3) that regulates an output voltage $V_{OUT}$.

An example operation of the system 300 begins with the CLK signal in a high state and the $\overline{\text{CLK}}$ signal in a low state, so the node N1 voltage is greater than the node N2 voltage. In this first state of the differential signal: the FETs Q1 and Q4 are turned on, so they conduct; and the FETs Q2 and Q3 are turned off, so they have high impedance and do not conduct. Accordingly, current flows from the node N1, through the resistor R1 and the FET Q1 and continuing through a load represented by the resistor $R_L$. The second ground 138 floats, so the node N2 voltage is lower than the second ground 138 voltage, and the return path for the current is through the FET Q4 and the resistor R4 and continuing to the node N2. In that case, the node N3 has a positive voltage relative to the second ground 138.

The first circuit 306 and the second circuit 308 change states of their respective FETs in response to the CLK signal switching low and the $\overline{\text{CLK}}$ signal switching high. When the node N2 voltage is greater than the node N1 voltage, the FETs Q1 and Q4 turn off, and the FETs Q2 and Q3 turn on in this second state of the differential signal. Because the second ground 138 floats, the node N1 voltage is lower than the second ground 138 voltage. The current in the system 300 flows from the node N2, through the resistor R2 and the FET Q2, and continuing to the node N3. The current then flows through the load resistance $R_L$, the FET Q3, the resistor R3 and continuing to the node N1. Accordingly, the potential at the node N3 is the same in both states of the signals CLK and $\overline{CLK}$.

As described above, the voltage polarity at the node N3 stays the same regardless of the voltages on the nodes N1 and N2. In some instances, the nodes N1 and N2 may switch between high and low voltages at slightly different times, which causes voltage fluctuations at the node N3. The capacitor $C_L$ maintains a relatively constant voltage at the node N3. The voltage $V_S$ powers devices of the second circuit 104, such as the ADC 134.

Referring also to FIG. 1, the second circuit 104 has a filter 132 to filter the voltage $V_S$. Some embodiments of the second circuit 104 do not include the additional filter 132. One of the benefits of the system 100 is that the second circuit 104 generates the predetermined and accurate voltages $V_S$ and $V_{OUT}$, without requiring communications or feedback to the first circuit 102. Accordingly, isolation between the first circuit 102 and the second circuit 104 is improved relative to conventional systems.

Figure 4:
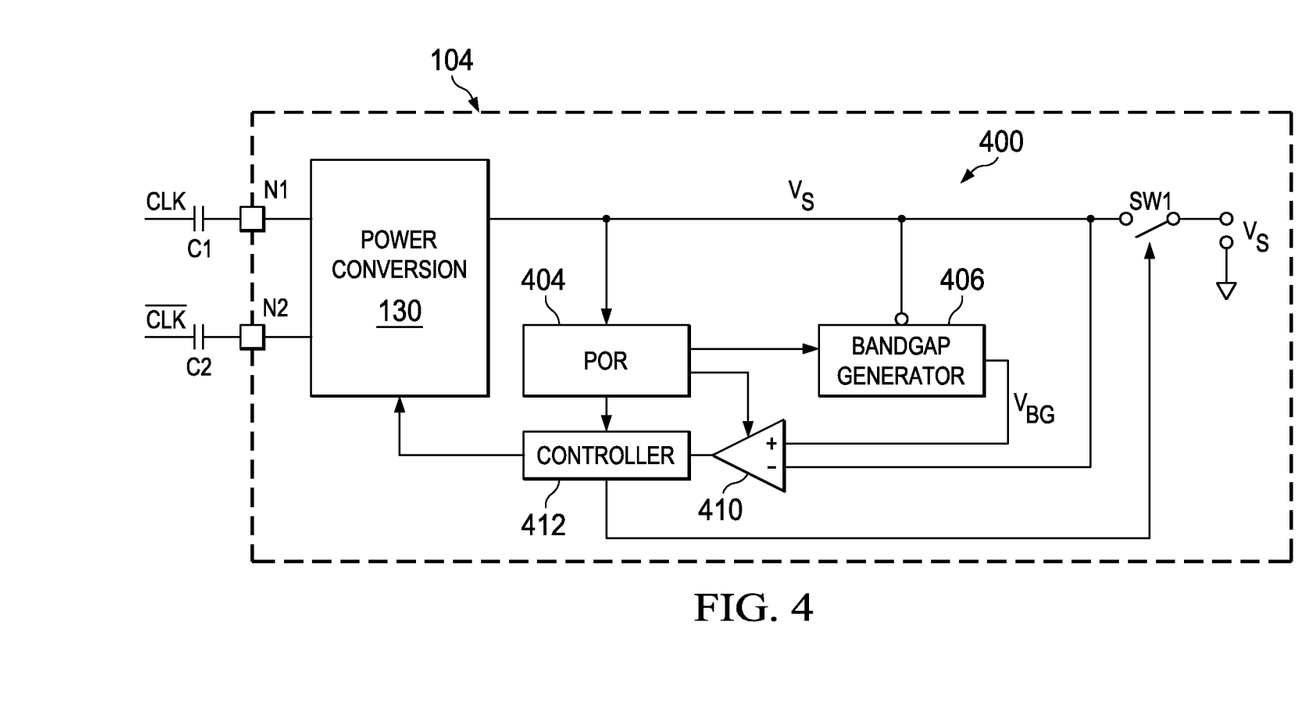
FIG. 4 is a block diagram of example circuitry that regulates the voltage generated by the power conversion device of FIG. 1.

FIG. 4 is a block diagram of example circuitry 400 that monitors and regulates the voltage generated by the power conversion device 130 of FIG. 1. The circuitry 400 includes a power-on-reset (POR) device 404, which is coupled to the power conversion device 130 and monitors the voltage $V_S$. In response to the voltage $V_S$ reaching a predetermined value, the POR device 404 generates signals to enable other components in the circuitry 400. A bandgap generator 406 is also coupled to the power conversion device 130 and generates a bandgap voltage $V_{BG}$ in response to the voltage $V_S$.

In the example of FIG. 4, the bandgap generator 406 is enabled by a signal generated by the POR device 404. A comparator 410 compares the voltage generated by the bandgap generator 406 to the voltage $V_S$ and outputs a signal to a controller 412. In this example, the comparator 410 is enabled by the POR device 404. The controller 412 monitors the output of the comparator 410 and adjusts the power conversion device 130 to raise or lower the voltage $V_S$. Also, in this example, the controller 412 controls a switch SW1 that couples the power conversion device 130 to other components on the second circuit 104 when the value of the voltage $V_S$ is within predetermined limits. In some embodiments, the circuitry 400 monitors the output voltage $V_{OUT}$ (FIG. 1) instead of the voltage $V_S$, and performs the same operations to regulate the voltage $V_{OUT}$ with the power conversion device 130.

When the second circuit 104 receives power, the power conversion device 130 starts generating the voltage $V_S$ as described above. In some embodiments, the voltage $V_S$ is filtered to remove AC components. At least some time may elapse while the power conversion device 130 finishes its adjustment of the voltage $V_S$ to be within predetermined limits that are suitable for operation of devices on the second circuit 104.

In response to the voltage $V_S$ reaching a predetermined value, the POR device 404 initializes and generates signals to enable the bandgap generator 406, the comparator 410, and the controller 412. In some embodiments, the devices are enabled simultaneously. In other embodiments, the devices are enabled sequentially (e.g., one at a time). For example, in at least one embodiment, the bandgap generator 406 is enabled first, followed by the comparator 410, and then the controller 412. In some embodiments, the POR device 404 draws current that is equivalent to the current drawn by devices on the second circuit 104, so that the voltage $V_S$ measured during initialization is representative of the voltage under normal load conditions.

The bandgap generator 406 generates a precise reference bandgap voltage $V_{BG}$ that is equal to or proportional to the ideal value of the voltage $V_S$. The comparator 410 compares the bandgap voltage $V_{BG}$ or a scaled version of the bandgap voltage $V_{BG}$ to the voltage $V_S$ and generates an output signal (e.g., voltage) that indicates the difference between the bandgap voltage $V_{BG}$ and the voltage $V_S$. In this example, the output signal is representative of the rectified voltage. The controller 412 analyzes the output signal to determine whether the voltage $V_S$ is too high, too low, or within a predetermined range. If the voltage $V_S$ is too high or too low, the controller causes the power conversion device 130 to change the voltage $V_S$. If the voltage $V_S$ is within the predetermined range, the controller 412 closes the switch SW1, so the power conversion device 130 provides power to devices on the second circuit 104. In embodiments where the POR device 404 draws current that is equivalent to current drawn by devices on the second circuit 104, the current draw by the POR device 404 is disabled when the switch SW1 is closed.

Figure 5:
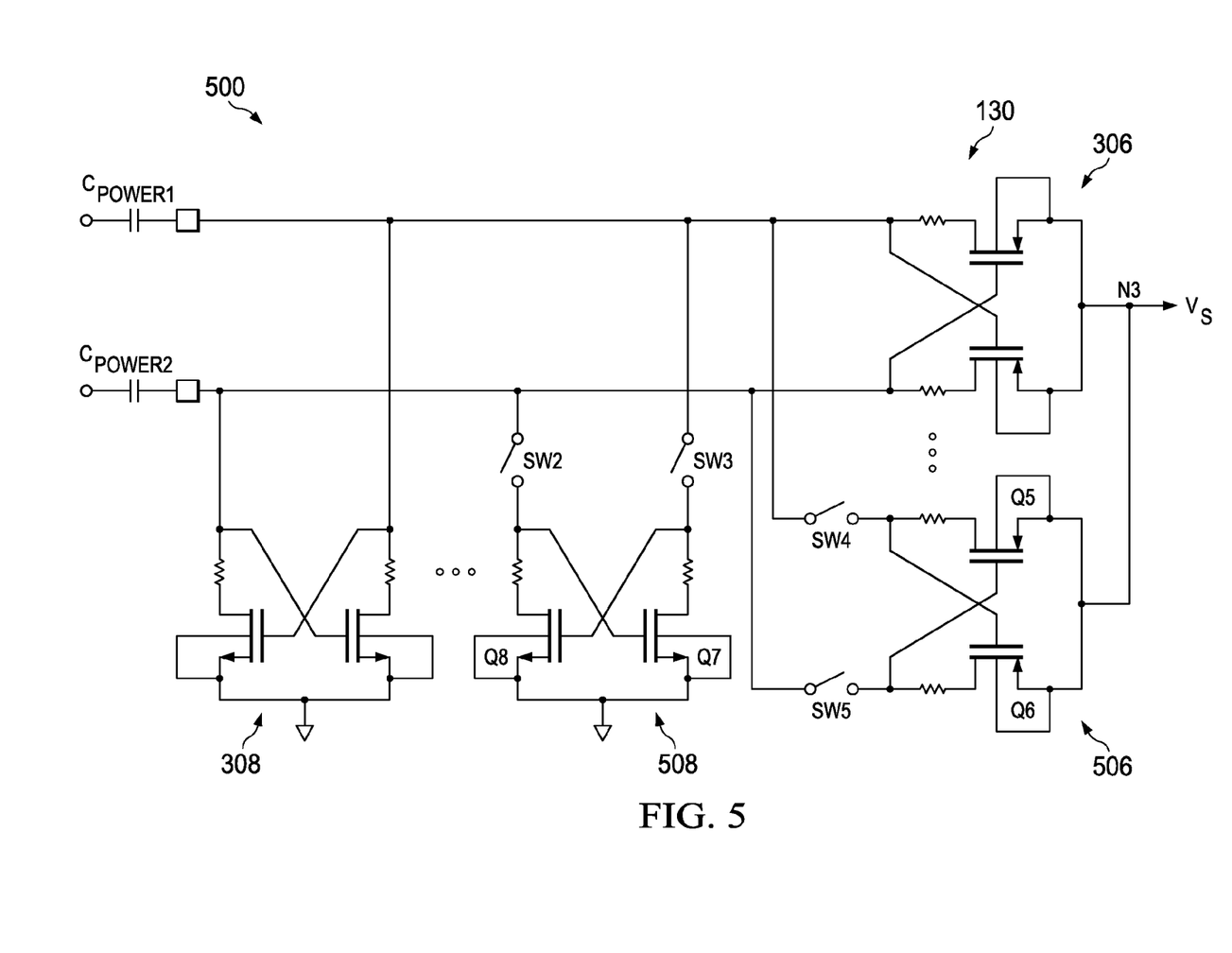
FIG. 5 is a schematic diagram of another example circuitry of the power conversion device of FIG. 1.

Different embodiments exist for controlling the voltage $V_S$. FIG. 5 is a schematic diagram of another example circuitry 500 of the power conversion device 130 of FIG. 1. The circuitry 500 is similar to the circuitry 300 of FIG. 3, but the circuitry 500 includes extra rectification circuits 506 and 508. The rectification circuits 506 and 508 add or subtract parallel resistance, which increases or decreases the voltage $V_S$. The rectification circuits 506 and 508 are electrically coupled to a remainder of the circuitry 500 through switches SW2, SW3, SW4 and SW5. For example, if the voltage $V_S$ is too high, the controller 412 (FIG. 4) opens the switches SW2, SW3, SW4 and SW5 to disconnect the rectification circuits 506 and 508 from the remainder of the circuitry 500, and thereby increase the resistance and lower the voltage $V_S$. Conversely, if the voltage $V_S$ is too low, the controller 412 closes the switches SW2, SW3, SW4 and SW5 to connect the rectification circuits 506 and 508 to the remainder of the circuitry 500, and thereby lower the resistance and increase the voltage $V_S$. In other embodiments, more rectification circuits are connected in parallel to achieve a higher degree of voltage control.

Figure 6:
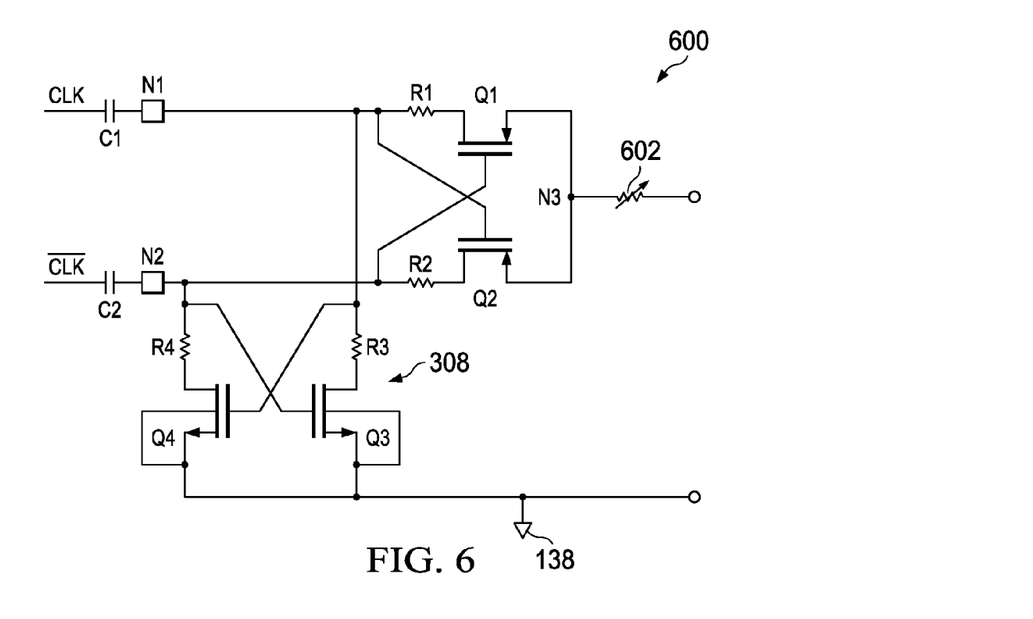
FIG. 6 is a schematic diagram of another example circuitry of the power conversion device of FIG. 1.

FIG. 6 is a schematic diagram of another example circuitry 600 of the power conversion device 130 of FIG. 1. The circuitry 600 is similar to the circuitry 300 of FIG. 3, but the circuitry 600 includes a variable resistor 602 coupled to the node N3. The variable resistor 602 is controlled by the controller 412 (FIG. 4) to increase or decrease the voltage $V_S$.

The system 100 of FIG. 1 and the related embodiments achieve many benefits over conventional systems. For example, the system 100 transfers power from the first circuit 102 to the second circuit 104 without requiring feedback from the second circuit 104 to the first circuit 102. Accordingly, the system 100 has fewer data lines or communications that are susceptible to transients between the first circuit 102 and the second circuit 104. With capacitors as the isolation elements 108, the power transfer across the isolation elements 108 is improved over other devices, such as silicon transformers.

Modifications are possible in the described embodiments, and other embodiments are possible, within the scope of the claims.

What is claimed is:

1. A system for transferring power from a first circuit to a second circuit by a differential signal generated in the first circuit, the system comprising:
   a first isolation element for transmitting a first component of the differential signal between the first and second circuits;
   a second isolation element for transmitting a second component of the differential signal between the first and second circuits, the second component being a complement of the first component;
   a digital rectifier coupled to the first and second isolation elements for generating a rectified voltage in response to the first and second components of the differential signal;
   circuitry for monitoring the rectified voltage and generating a signal representative of the rectified voltage;
   a controller for changing the rectified voltage in response to the signal representative of the rectified voltage; and
   a switch coupled to the output of the digital rectifier, wherein the state of the switch is controlled by the controller in response to the signal representative of the rectified voltage.

2. The system of claim 1 wherein the first and second isolation elements are capacitors.

3. The system of claim 1 further comprising a variable resistance coupled to the output of the digital rectifier, wherein the controller controls the variable resistance.

4. The system of claim 1 further comprising a plurality of rectification modules that are able to be coupled in parallel, each rectification module having a resistance associated therewith, wherein the controller couples and decouples at least one of the rectification modules in response to the signal representative of the rectified voltage.

5. The system of claim 1 wherein the circuitry for monitoring includes a power on reset device for monitoring the rectified voltage and for enabling other devices in the circuitry for monitoring.

6. The system of claim 1 wherein the circuitry for monitoring includes a bandgap generator for generating a reference voltage and a comparator for comparing the reference voltage to the rectified voltage, wherein the signal representative of the rectified voltage is generated by the comparator.

7. The system of claim 1 wherein the differential signal has a first state in response to the voltage at the first isolation element being greater than the voltage at the second isolation element, and a second state in response to the voltage at the second isolation element being greater than the voltage at the first isolation element, and
   wherein the digital rectifier includes:
      a first switch coupled between the first isolation element and a node, the first switch for passing current in response to the differential signal being in the first state and for blocking current in response to the differential signal being in the second state;
      a second switch coupled between the second isolation element and the node, the second switch for blocking current in response to the differential signal being in the first state and for passing current in response to the differential signal being in the second state;
      a third switch coupled between the first isolation element and a ground, the third switch for blocking current in response to the differential signal being in the first state and for passing current in response to the differential signal being in the second state; and
      a fourth switch coupled between the second isolation element and the ground, the second switch for passing current in response to the differential signal being in the first state and for blocking current in response to the differential signal being in the second state.

8. The system of claim 7 further comprising:
   a first resistance coupled between the first switch and the first isolation element;
   a second resistance coupled between the second switch and the second isolation element;
   a third resistance coupled between the third switch and the first isolation element; and
   a fourth resistance coupled between the fourth switch and the second isolation element;
   the first, second, third, and fourth resistances for isolating the isolation elements from at least one capacitance in the system.

9. The system of claim 8 wherein the value of the first resistance is approximately equal to four times a high voltage at the first isolation element divided by the maximum current flow through the first isolation element.

10. The system of claim 1 wherein the first circuit includes a first ground, and the second circuit includes a second ground electrically isolated from the first ground.

11. A system for transferring power from a first circuit to a second circuit by a differential signal generated in the first circuit, the system comprising:
   a first isolation element for transmitting a first component of the differential signal between the first and second circuits;
   a second isolation element for transmitting a second component of the differential signal between the first and second circuits, the second component being a complement of the first component, the differential signal having a first state in response to a voltage at the first isolation element being greater than a voltage at the second isolation element, and having a second state in response to the voltage at the second isolation element being greater than the voltage at the first isolation element;
   a digital rectifier coupled to the first and second isolation elements for passing current through a load in a predetermined direction, the load being coupled between the rectifier and a ground, wherein the rectifier includes:
      a first switch coupled between the first isolation element and the load, the first switch for passing current in response to the differential signal being in the first state and for blocking current in response to the differential signal being in the second state;
      a second switch coupled between the second isolation element and the load, the second switch for blocking current in response to the differential signal being in the first state and for passing current in response to the differential signal being in the second state;
      a third switch coupled between the first isolation element and the ground, the third switch for blocking current in response to the differential signal being in the first state and for passing current in response to the differential signal being in the second state; and
      a fourth switch coupled between the second isolation element and the ground, the second switch for passing current in response to the differential signal being in the first state and for blocking current in response to the differential signal being in the second state.

12. The system of claim 11 wherein the first and second isolation elements are capacitors.

13. The system of claim 11 wherein at least one of the first switch, the second, the third switch, or the fourth switch is a field effect transistor (FET).

14. The system of claim 11 wherein the first and second switches are P-channel FETs, and wherein the third and fourth switches are N-channel FETs.

15. The system of claim 11 wherein the first and second switches are N-channel FETs, and wherein the third and fourth switches are P-channel FETs.

16. The system of claim 11 wherein:
the first switch is a first FET having a gate coupled to the second isolation element;
the second switch is a second FET having a gate coupled to the first isolation element;
the third switch is a third FET having a gate coupled to the second isolation element; and
the fourth switch is a fourth FET having a gate coupled to the first isolation element.

17. The system of claim 16 further comprising:
a first resistance coupled between the first FET and the first isolation element;
a second resistance coupled between the second FET and the second isolation element;
a third resistance coupled between the third FET and the first isolation element; and
a fourth resistance coupled between the fourth FET and the second isolation element.

18. The system of claim 17 wherein the value of the first resistance is approximately equal to four times a high voltage at the first isolation element divided by the maximum current flow through the first isolation element.

19. The system of claim 11 further comprising a voltage regulator for regulating an output of the digital rectifier.

20. A system for transferring power from a first circuit to a second circuit by a differential signal generated in the first circuit, the system comprising:
a first capacitor for transmitting a first component of the differential signal between the first and second circuits;
a second capacitor for transmitting a second component of the differential signal between the first and second circuits, the second component being a complement of the first component, the differential signal having a first state in response to a voltage at the first capacitor being greater than a voltage at the second capacitor, and having a second state in response to the voltage at the second capacitor being greater than the voltage at the first capacitor;
a digital rectifier coupled to the first and second capacitors for generating a rectified voltage in response to the first and second components of the differential signal, wherein the digital rectifier includes:
a first switch coupled between the first capacitor and the load, the first switch for passing current in response to the differential signal being in the first state and for blocking current in response to the differential signal being in the second state;
a second switch coupled between the second capacitor and the load, the second switch for blocking current in response to the differential signal being in the first state and for passing current in response to the differential signal being in the second state;
a third switch coupled between the first capacitor and the ground, the third switch for blocking current in response to the differential signal being in the first state and for passing current in response to the differential signal being in the second state; and
a fourth switch coupled between the second capacitor and the ground, the second switch for passing current in response to the differential signal being in the first state and for blocking current in response to the differential signal being in the second state,
circuitry for monitoring the rectified voltage and generating a signal representative of the rectified voltage; and
a controller for changing the rectified voltage in response to the signal generated by the circuitry for monitoring the rectified voltage.

\* \* \* \* \*